June 22, 1948.   W. A. O'BRIEN   2,443,960
CONTROL MEANS FOR CUPOLA FURNACES
Filed March 9, 1944   2 Sheets—Sheet 1

INVENTOR.
WILLIAM A. O'BRIEN
BY
ATTORNEYS

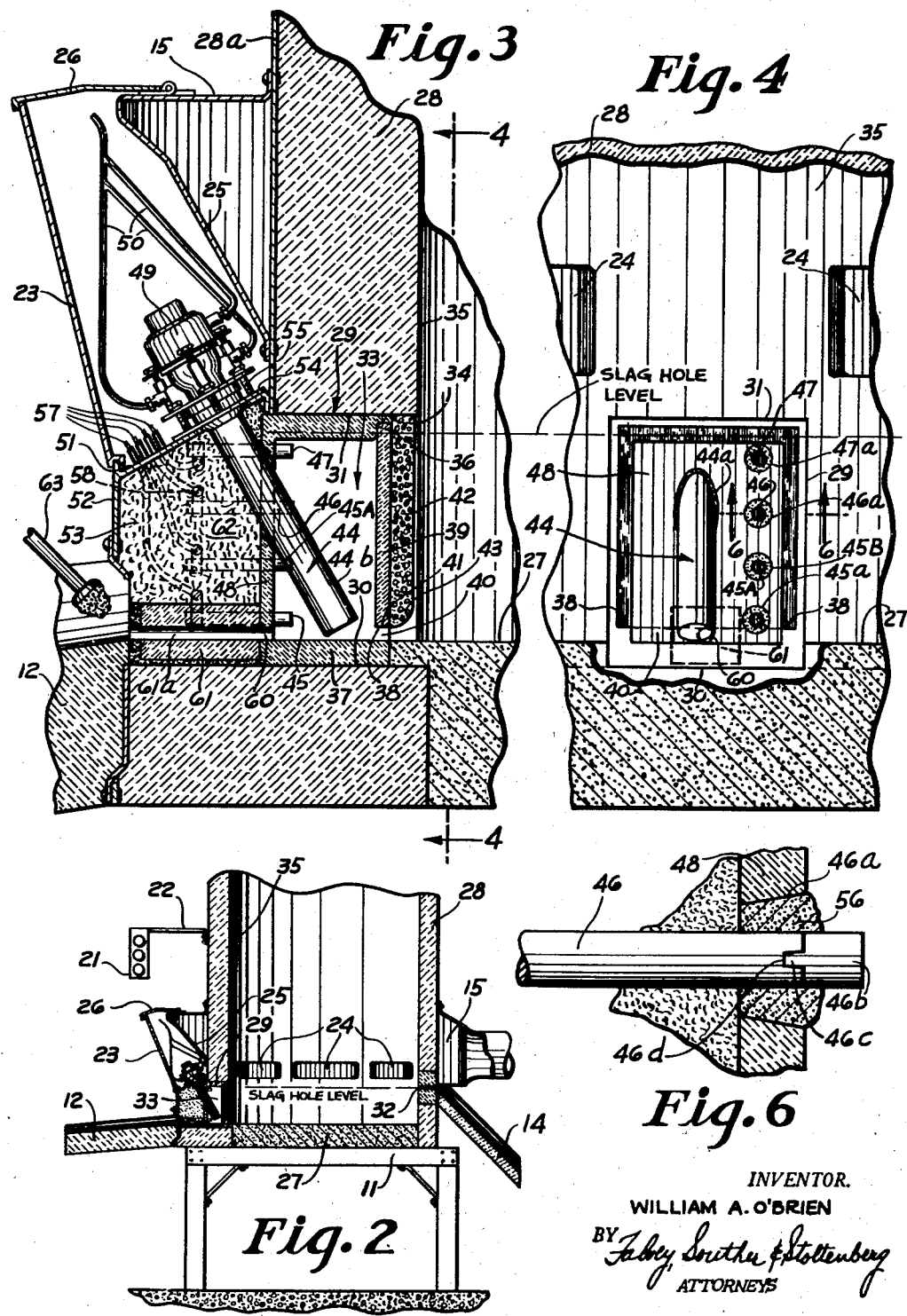

Patented June 22, 1948

2,443,960

UNITED STATES PATENT OFFICE 2,443,960

CONTROL MEANS FOR CUPOLA FURNACES

William A. O'Brien, Fostoria, Ohio

Application March 9, 1944, Serial No. 525,686

5 Claims. (Cl. 266—30)

This invention relates to cupola furnaces, more particularly to the methods of controlling the output of cupola furnaces.

When ferrous metals are melted in a cupola furnace for the purpose of pouring castings, it is highly desirable that the temperature of the molten metal may be controlled within relatively close limits. At the same time it is highly desirable that the level of the molten metal in the cupola be known with sufficient accuracy at the time the molten metal is withdrawn from the cupola into a pouring ladle, particularly with reference to the status of melting of the individual charges of metal dropped into the cupola from above. In general these charges of metal which are to be melted are alternated with charges of coke, each charge of metal and coke being carefully proportioned to give uniform melting conditions within the cupola. The charge of metal is usually made up of predetermined quantities of pig iron, scrap iron, which usually includes plant returns such as gates, bad castings, etc., and lastly steel scrap. The proportions of these constituents of the charge depend upon an analysis of the different iron forms so that the chemical constituents of the melted metal in the cupola may be capable of being controlled, particularly with reference to silicon and carbon.

These charges of metal and coke are dumped alternately into the cupola over a bed of coke, for example, the coke bed may comprise in a typical cupola, 3500 pounds of coke which is ignited to form the bed, then a charge of iron of approximately 2000 pounds is dumped which may constitute 800 pounds of pig iron, 1000 pounds of scrap iron and 200 pounds of steel scrap. Above this charge, a charge of coke of about 200 pounds is dumped, and thereafter a second charge of metal is dumped into the cupola and so forth alternately metal and coke in the given proportions are dumped into the cupola until the desired level is obtained. The air blast is then injected into the cupola to start the melting of the metal.

Inasmuch as the charge of metal consisting of the pig iron, scrap iron and scrap steel may not have the same physical characteristics so that melting occurs uniformly, this being particularly true when pieces of the various iron and steel are of various sizes and also due to the fact that steel has a much higher melting point than the pig or scrap iron, it is highly desirable that molten metal be withdrawn from the cupola during a period in which a charge of metal has just been completely melted and before the next succeeding charge of metal shall begin to melt. At this time the chemical constitution of the molten metal is substantially predetermined within narrow limits and allows an operator to give a reasonably accurate estimate of the characteristics of the molten metal which is issuing from the furnace. Usually it is also desirable to withdraw molten metal from the furnace after several of the iron charges have been fully melted so that an average physical and chemical condition may be obtained in the molten metal from the several metal charges which have been melted, which has a tendency of giving more uniform qualities both physically and chemically to the molten metal as it issues from the cupola.

An operator can, by controlling the characteristics of the metal dumped into the cupola, determine the melting conditions in the cupola with reasonable accuracy if he knows the level of the molten metal in the cupola, and this invention contemplates the provision of an electrical measuring system whereby an operator can determine the status of the melting conditions having reference to the individual metal charges. Knowing the chemical and physical characteristics of the molten metal within reasonable limits as it issues from the cupola, an operator can add "addition" ingredients to the molten metal, such as carbon, manganese, etc., to obtain the desired physical and chemical characteristics of the metal in the castings. If the characteristics of the basic melt are reasonably uniform, the amount of the "addition" ingredients for a given quantity of molten metal, such as the amount of metal in a full ladle, can be calculated with considerable accuracy to give a reasonable control over the characteristics of the metal in the final castings.

The present invention contemplates the provision of an electrical measuring system whereby the temperature of the molten metal in the furnace can be measured continuously and can be determined with reasonable accuracy before beginning a "pour."

This invention further contemplates the provision of an electrical signalling system which is capable of giving a clear indication to an operator of the amount of molten metal which is available in a cupola furnace. The operator is then able to estimate the characteristics of the molten metal and is assured that there is always sufficient metal available to fill a ladle. Knowing the characteristics of the basic melt he can calculate the quantities of "addition" ingredients to be added to the molten metal to give the predetermined physical and chemical characteristics when the molten metal is poured into the molds to form castings.

The present invention further contemplates the provision of an additional signalling circuit to cooperate with the signalling system set forth in the previous paragraph which will give semi-automatic control over the maximum level of molten metal in a cupola furnace. The air blast which is issuing from tuyères in the cupola, to provide the necessary temperature to melt the metal, is controlled electrically and terminated when the level of molten metal reaches the maximum so that no further metal is melted until sufficient molten metal is withdrawn from the cupola to again give rise to conditions under which further melting of metal may take place. A cupola is generally provided with a slag hole which allows an operator to withdraw, from the surface of the molten metal in the cupola, slag which is formed as a by-product of the melting operations and it is essential that this floating coating of slag shall be maintained over the molten metal to protect the metal from adverse conditions in the cupola. Should the level of molten metal rise until it reaches a level above the slag hole, the molten metal would flow from the furnace through the slag hole when it is opened by an operator. This would result in loss of metal and at the same time would allow cooling air currents to come in contact with the surface of the molten metal with deleterious effects. Furthermore, it is advantageous to control the level of the molten metal to maintain it at a point somewhat below the slag hole to prevent the floating slag from being carried upwardly into the tuyères which would result in the blocking of the tuyères and impeding the air blast and necessitating a shutdown of the furnace for a cleanout. The electrical system provided for this purpose automatically terminates the air blast which reduces the temperature in the cupola to prevent further melting of metal. After the operator has withdraw a "pour" from the furnace, the air blast may be again initiated at the volition of the operator, who is provided with a manual overcontrol which must be actuated in order to start the blowers.

The invention further contemplates providing an installation in a cupola which will give continuous indications of temperature and/or level of the molten metal in a cupola furnace and at the same time will fully protect the instrumentalities by which these readings are obtained from adverse physical conditions in the cupola, which might cause breakage, slagging, etc. This result is obtained by the provision of an enclosed well formed in the wall of the cupola in which these sensitive instrumentalities are mounted, the well having an entry aperture adjacent its lower end wall in communication with the interior of the cupola so that the molten metal may readily flow into the well and seek its own level. In order to obviate undue cooling of the segregated molten metal in the well, the spout opening of the cupola is located in the exterior wall of the well substantially opposite the entry aperture so that molten metal which is drawn from the cupola must first pass through the well before it can flow into a ladle. This prevents stagnant molten metal from collecting in the well and, inasmuch as the instrumentalities which are used to register the temperature and level of the molten metal are positioned in this well, more accurate readings may be obtained from the signalling and measuring circuits cooperating with these instrumentalities due to the fact that the molten metal which is in contact with them is being changed frequently as molten metal is withdrawn from the cupola.

It is, therefore, a principal object of this invention to provide electrical measuring instruments for a cupola furnace to indicate temperature and level of molten metal therein, the instrumentalities of these measuring instruments in contact with the molten metal being positioned in a protective well having communication with the cupola and with the spout opening.

It is a further object of this invention to provide a control means for a cupola which will shut off the air blast when the molten metal attains a predetermined level having a relation to the slag hole in the cupola.

It is a further object of this invention to provide a protective device for the instrumentalities of electrical measuring circuits in contact with molten metal in a cupola furnace which will prevent physical damage to these instrumentalities by movements of material within the cupola furnace during a heat.

It is a further object of this invention to provide electrical indicating circuits for a cupola furnace which will accurately register temperature and level of molten metal in a cupola furnace.

It is a further object of this invention to provide a protective well in the wall of a cupola furnace to house the instrumentalities of electrical measuring circuits for indicating temperature and level of molten metal in the cupola, the molten metal in the protective well being renewable by cooperating with the pouring spout of the cupola to assure uniform measuring conditions for the instrumentalities so that an accurate indication of temperature and level of the molten metal in the cupola may be observed by an attendant.

Other objects and advantages of this invention relating to the arrangement, operation and function of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Fig. 2 is a sectional elevation of the cupola furnace.

Fig. 3 is a sectional elevation of a portion of the cupola furnace, taken through the pouring vent.

Fig. 4 is an elevational view partly sectional, taken along the line 4—4 of Fig. 3.

Fig. 6 is a sectional view, taken along the line 6—6 of Fig. 4.

Figure 1:
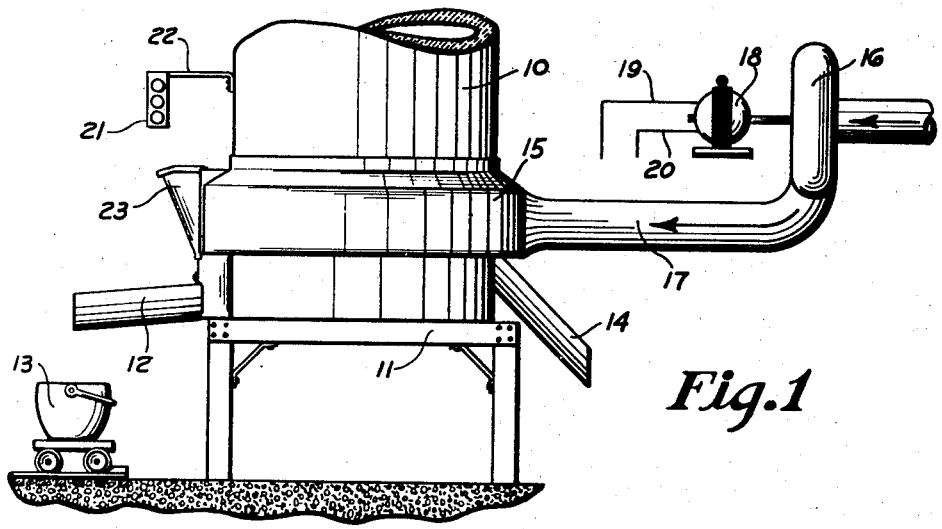
Fig. 1 is an elevational view of a cupola furnace to which the invention has been applied.

Referring to the drawings, particularly to Fig. 1, a cupola furnace 10 is shown supported on standard 11 to maintain a pouring trough 12 a substantial distance above the floor to allow molten metal to be poured into a ladle 13. On the opposite side of the furnace a second trough 14 is provided to allow venting of slag from the furnace. Girdling the furnace is an air box 15 which is in communication with a centrifugal blower 16 by means of an air duct 17. The blower 16 is operated by an electric motor 18 which receives its power by leads 19 and 20. On the forward side of the furnace, preferably adjacent the pouring trough 12, a group of signal lights 21 are provided attached to the cupola by means of bracket 22 so as to be clearly visible to an operator. Immediately above the pouring trough the air box 15 is cut away and provided with a box-like construction 23 in which are mounted electrical instrumentalities which form a part of this invention.

Referring now to Fig. 2, the air box 15 girdles the furnace adjacent tuyères 24 which allow the air blast to issue into the interior of the furnace from the air box. As has already been pointed out, the air box 15 adjacent the pouring spout 12 is cut away and preferably provided with a baffle 25 which will close the air box 15 adjacent the cut away portion. The box 23 is preferably made of sheet metal and is provided with a hinged cover 26 to allow entry into the box for adjustment of the electrical instrumentalities mounted therein and to be described in detail hereinafter.

As is well known in the art, floor 27 of the cupola furnace is removable to allow repairs to the interior of the furnace after the completion of a day's operation. Ordinarily in a foundry, two of these cupola furnaces are provided, preferably positioned immediately adjacent each other to allow alternate use thereof, for example, if furnace A is in operation, furnace B will be idle so that its floor may be removed and repairs made to its interior so as to be ready for operation the following day. On the following day the furnace B which has just been repaired is placed in operation while furnace A, which operated the previous day, has its floor removed and necessary repairs made. In this way continuous operation of the foundry is made possible. A single control means is provided for both furnaces and switching means are provided so that the control means may be used with either cupola and its signalling devices as will be described in further detail hereinafter.

The floor 27 of the cupola furnace may comprise refractory sand or the like, supported in the usual manner to be readily removable, while the walls 28 of the furnace are made of refractory brick positioned inside a metal envelope 28a as is most clearly shown in Fig. 3. With the floor 27 of the furnace removed, an operator is able to make necessary repairs to the interior surface of the furnace which in many cases is roughened by the action of the heat during operation of the furnace. In order to install the instrumentalities of this invention in the furnace, the operator cuts an aperture 29 (Fig. 4) which may be generally of a rectangular contour, the base 30 of which is slightly below the level of the sand floor 27 of the furnace while the upper terminus 31 of the aperture extends slightly above the level of a slag vent 32 which is preferably positioned diametrically opposite from the aperture 29 and cooperates with the trough 14 for the purpose of withdrawing slag from the interior of the furnace during operation.

An open-ended box-like structure 33 is positioned in the aperture, being approximately of the same dimension, and cemented in place by a fire-clay composition as is well known in the art. The box 33 is positioned in the aperture 29 with its open end exposed to the interior of the furnace and with its forward edge 34 disposed slightly behind the inner surface 35 of the cupola for purposes which will be described hereinafter. The forward edge is provided with a recess 36 which extends around three sides of the box and terminates a slight distance above the lower side 37 of the box to form an abutment 38 against which rests a refractory cover 39 closely fitting into the recess 36. The vertical dimension of the cover 39 is somewhat less than the dimension of the box so that a rectangular aperture 40 is formed between a lower terminus 41 of the cover 39 and the lower side 37 of the box. The cover 39 is held in position in the recess 36 by means of a thick protective coating of cement 42 composed of fire-clay and other constituents as is well known in the art. The body of cement 42 is positioned under the over-hanging of the interior 35 of the wall 28 so as to provide a smooth surface on the interior of the furnace, and is chamfered at 43 to give a smooth entrance to the aperture 40 which provides communication between the interior of the box or enclosure 33 and the interior of the furnace.

It is clear that as molten metal collects above the floor 27 of the furnace when it is in operation the molten metal will flow through the aperture 40 into the interior of the enclosure 33 to seek its own level. The molten metal which flows into the interior of the box 33 comes in contact with electrical instrumentalities such as a temperature measuring device 44 and electrodes 45, 45A, 46 and 47, all of which are mounted in apertures 44a, 45a, 45B, 46a and 47a, all in the side 48 of the box-like construction.

The portion of the electrical instrumentality 44 which projects into the interior of the box-like enclosure through oblique aperture 44a may be a refractory tube sealed in the aperture 44a by means of refractory cements such as are well known in the art. Measuring devices 49 are provided cooperating with the refractory tube which may comprise optical pyrometers which are responsive to the temperature of the bottom 44b of the refractory tube and are placed in electrical circuit by means of conductors 50 which extend to indicating instruments, preferably located at a remote place from the cupola furnace. It is to be understood that any pyrometric device for measuring temperature or other conditions of the molten metal may be used in connection with the box-like enclosure.

The instrumentality 44, with its refractory tube, is held in aligned position with oblique aperture 44a by means of an oblique plate 51 which is conveniently attached to the metal shell 28a of the cupola and to a vertical plate 52 which forms the outside wall of a compartment 53 into which projects the terminal ends of instrumentalities 45, 45A, 46 and 47 which will be described in detail hereinafter. The refractory tube may be provided at its upper end with a collar 54 supported by the plate 51 and to which measuring device 49 is attached by means of bolts 55.

The electrical instrumentalities 45, 45A, 46 and 47 are generally in the nature of electrodes, preferably being made of carbon rods, which are inserted in apertures in the side wall 48 of the box-like enclosure as is most clearly shown in Fig. 6 with reference to electrode 46. The aperture 46a in the side wall 48 of the enclosure is tapering in form and considerably larger than the outside dimension of the electrode 46 which allows the positioning of a body of refractory cement 56 to hold the electrode firmly in position in the enclosure and to insulate the same electrically so that the electrode may be placed in an electric circuit by means of conductor 57 as most clearly shown in Fig. 3. The conductor 57 is connected to the electrode 46 by means of a clamping device 58. Electrodes 45, 45A, and 47 are also provided with conductors, being connected to the body of the electrode in the same manner.

Inasmuch as the electrodes 45, 45A, 46 and 47 are made of carbon, the tips of which are in contact with molten metal at a very high temperature, it is obvious that the electrodes are subject to erosion and burning. A renewable tip 46b is therefore provided, which has a lug 46c which cooperates with a kerf 46d so as to hold the tip 46b to the main body of the electrode. Inasmuch as the destruction of the tip 46b is relatively rapid, these tips must be replaced on all of the electrodes 45, 45A, 46 and 47 after each day's exposure to the molten metal. These electrodes are placed in an electric circuit as will be described hereinafter.

The electrode 45 is preferably positioned adjacent the bottom end 37 of the box-like enclosure forming a common ground terminal, while the electrodes 45A and 46 are positioned preferably adjacent the central portion of the box-like enclosure and the electrode 47 is preferably positioned near the upper end. The relative position of these electrodes may be varied to suit the conditions which an operator desires to indicate; for example, the relative position of the electrodes 45, 45A and 46 is determined by the amount of metal which an operator needs to fill a pouring ladle with a desirable margin to assure that the ladle, or the desired number of ladles, may be filled at one time. The relative relation between the electrodes 46 and 47 has a relation to a control for the blower 16 (Fig. 1) as driven by electric motor 18.

Should the level of the molten metal attain the datum of electrode 47, an electric circuit will be established which will break the power circuit to the motor 18 to stop the blower 16 which will terminate the air blast which is being supplied to the cupola furnace through tuyères 24. When the air blast stops, the temperature in the furnace will drop so that the melting of metal stops and the level of the molten metal will not be raised above the datum of the electrode 47. Signal lamps 21 may be used in connection with electrodes 45, 45A, 46 and 47 to indicate to an operator the level of the molten metal in the cupola to advise the operator whether or not there is sufficient molten metal available in the furnace to fill the required number of ladles. The action of the electrodes, 45, 45A, 46 and 47 is such that an electric circuit is established when the molten metal comes into contact with the carbon tips 46b of the electrodes inasmuch as the molten metal is a good conductor of electricity.

The molten metal from the furnace enters the box-like enclosure 33 through aperture 40, as has already been described, and seeks its own level with reference to the level of molten metal in the interior of the furnace. Due to the fact that the molten metal in the enclosure is relatively isolated from the main body of the molten metal in the interior of the furnace, the heat losses due to radiation and conduction through the furnace walls causes a reduction in temperature of the molten metal in the enclosure so that the measuring devices, particularly the temperature indicating devices, will no longer give an accurate indication of the conditions of the molten metal in the interior of the furnace. In order to avoid these difficulties, this invention provides a means for renewing the molten metal in the enclosure to prevent stagnation which would result in inaccurate readings being recorded by the measuring instrumentalities. To attain this end, pouring vent 60 of the cupola is centrally positioned in the outer side wall 48 of the enclosure 33, just above the level of the bottom 37, so that as molten metal is being drawn from the furnace, the molten metal in the enclosure will be subject to withdrawal first, at the moment the pouring vent 60 is opened at the outside of the cupola by an operator in a manner well understood in the art.

A vent block 61 of refractory material is provided, having an aperture 61a aligned with the pouring vent 60 so as to lead the molten metal to the exterior of the furnace into the trough 12 to issue into the pouring ladle 13. The vent block 61 is positioned on the floor of compartment 53, being held in position by means of refractory cement such as is commonly used in the art. In order to insulate and protect the terminal ends of the instrumentalities 45, 45A, 46 and 47, a filling of loose refractory material 62 is positioned in the compartment 53 between the vent block 61 and the oblique plate 51.

When molten metal is withdrawn from the cupola furnace by an operator, the pouring vent 60 is opened at its outer end which allows the molten metal to issue from the cupola into the pouring ladle through the agency of the trough 12. The first metal to issue from the cupola furnace will proceed from the enclosure 33 to prevent the stagnation of metal in the enclosure. However, new metal will continuously pour into the enclosure through aperture 40 from the interior of the furnace to maintain its own level within the enclosure. Due to the fact that the size of aperture 40 between the interior of the enclosure and the interior of the furnace is many times greater than the pouring vent, the level of molten metal in the enclosure will not be substantially lower to create a difference between its level and the level of molten metal in the interior of the furnace. An accurate determination can therefore be attained both as to the level of the molten metal in the interior of the furnace and also an accurate determination of the temperature of the molten metal due to the fact that the metal which comes in contact with the end 44b of the pyrometric device 44 is constantly being renewed from the interior of the furnace so that the temperature recorded by the measuring and indicating instruments cooperating with the pyrometric device will be an accurate reflection of the temperature of the molten metal in the interior of the furnace. After the ladles have been filled, the operator will again close the outer end of the pouring vent 60 by means of plugger 63, the end of which is capped with a putty-like refractory body to close the pouring vent and stop the flow of molten metal.

Figure 5:
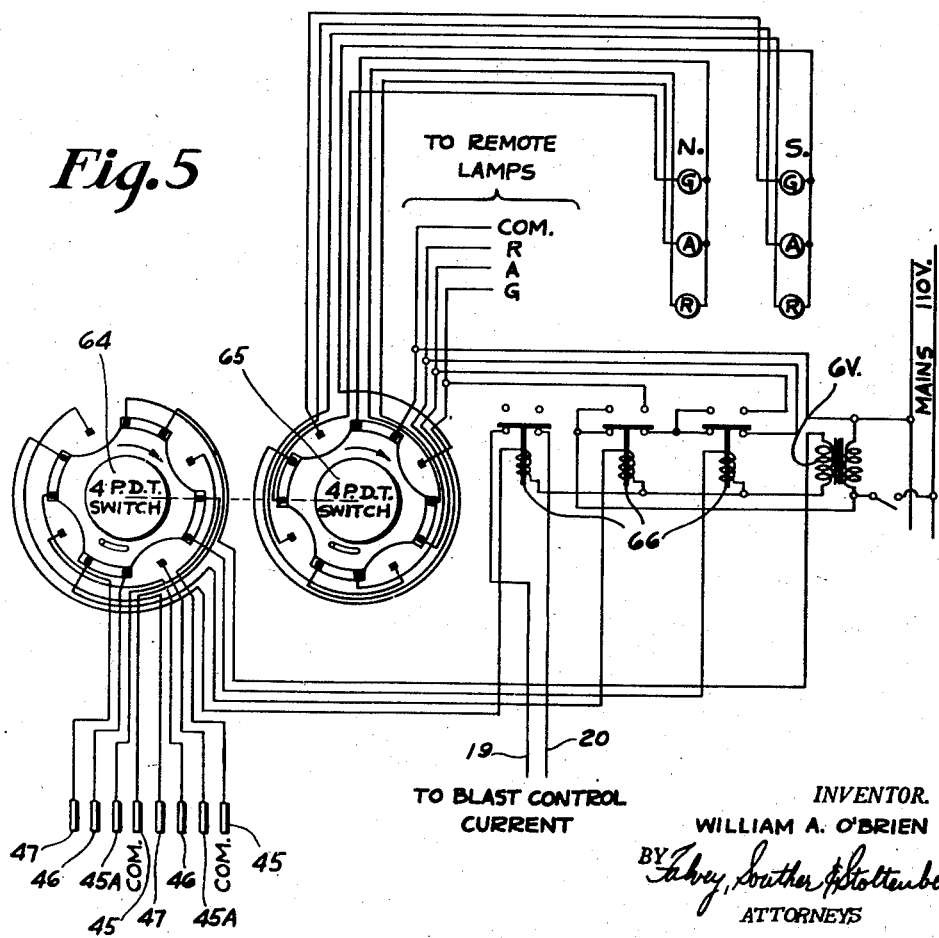
Fig. 5 is a schematic diagram of connections.

The signalling means 21, preferably comprising colored electric lights, cooperate with the electrodes 45, 45A, 46 and 47 and are connected as shown in the schematic diagram of connections in Fig. 5. Two sets of three lights are shown being preferably colored green, amber and red, although different arrangements may be used if desired, for example two lights may in many applications be adequate. As has already been pointed out, two cupola furnaces are generally used alternately, each being provided with a separate set of instrumentalities and signal lights as is clearly shown in the diagram of connections. Two four-pole double throw switches 64 and 65 are provided to manually control the instrumentalities of either cupola and to place them into electric circuit with the relays 66 which, in turn, control the signal lamps of the individual cupola furnaces. One of the relays 66 controls the current to the motor 18 so as to control the air blast to the cupola when the level of molten metal approaches the datum of the electrode 47.

If the level of molten metal is allowed to reach the level of the slag hole, molten metal will be vented from the furnace by the slag hole 32 which is wasteful and also air currents would blow over the surface of the metal to cool the molten metal. Furthermore, the slag, being of lesser density than the molten metal, would float and raise its level to that of the tuyères 24 and flow into the air box which would necessitate shutting down the furnace for a cleaning out. It is, therefore, very advantageous to maintain the level of the molten metal substantially below the level of the slag hole and the blower cut-off is a means whereby all danger of molten metal attaining these dangerous levels is obviated.

The electrical circuits cooperating with the pyrometric devices 49 are not shown in detail inasmuch as there are many different systems of measuring temperature which may be applied and utilized in the present invention. Any of the well known temperature measuring devices, particularly those which operate upon an optical principle, may be utilized in this application and no description of the details of these measuring devices, or the electrical circuits with which they cooperate, is necessary for a man skilled in the art to understand the operation of this invention.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In electrical measuring and control circuits for cupola furnaces, electrical instrumentalities cooperating with the molten metal in the furnace to indicate temperature and level conditions of the molten metal, measuring and indicating devices cooperating with the electrical instrumentalities including a source of electrical energy to indicate the said condition of the molten metal, and control means cooperating with the air blast of the cupola furnace to control the air blast when the level of the molten metal attains a predetermined level.

2. In a cupola furnace having a pouring vent and an electrical blower to provide an air blast, a box-like enclosure in a wall of the cupola furnace in communication with the interior of the furnace adjacent the floor thereof at the level of the pouring vent to allow molten metal to seek its own level therein, electrical instrumentalities positioned in said enclosure in contact with the molten metal and responsive to the level of the molten metal, electrical circuits including a source of energy cooperating with said instrumentalities, indicating devices in said electrical circuits and cooperating with said electrical instrumentalities to indicate the level of the molten metal, and means cooperating with the pouring vent and the enclosure to renew the molten metal in the enclosure.

3. In a cupola furnace including a pouring vent, a slag vent and an electrical blower to provide an air blast, an enclosure in the wall of the cupola in communication with the interior of the furnace adjacent the floor thereof at the level of the pouring vent to allow the molten metal to seek its own level in the enclosure, electrical instrumentalities positioned in said enclosure in contact with the molten metal and responsive to the level of the molten metal, measuring and indicating devices cooperating with said instrumentalities, and means also cooperating with said instrumentalities for terminating said air blast to the furnace when the level of the molten metal approaches the level of the slag vent.

4. In a cupola furnace having pouring and slag vents and including electrical blower means for providing an air blast, an enclosure in the wall of the cupola in communication with the interior of the furnace adjacent the floor thereof at the level of the pouring vent to allow molten metal to seek its own level therein, said enclosure extending to a point above the level of the slag vent, instrumentalities positioned in said enclosure in contact with the molten metal responsive to the level of the molten metal, electrical circuits including a source of electrical energy to cooperate with said instrumentalities, measuring and indicating devices cooperating with said instrumentalities and said electrical circuits to indicate the level of the molten metal, and means to terminate the air blast when the level of the molten metal reaches approximately the level of the slag vent.

5. In a protective device for electrical instrumentalities cooperating with a cupola furnace, an open-ended box-like enclosure positioned in a wall of the cupola adjacent the floor with its open side in communication with the interior of the furnace, cover means for the open side of the enclosure having an aperture adjacent the floor of the cupola to place the interior of the enclosure in communication with the cupola to allow molten metal to seek its own level therein, electrical instrumentalities positioned in said enclosure, including liquid level indicating and measuring devices and a source of electrical energy, to indicate the level of the molten metal, means to maintain the temperature and liquid level condition of the molten metal in the enclosure in contact with the electrical instrumentalities substantially the same as the said conditions of the molten metal in the furnace, and means cooperating with the electrical instrumentalities to control the operation of the furnace when the level of the molten metal attains a predetermined level.

WILLIAM A. O'BRIEN.

REFERENCES CITED

The following references are of record in the file of this patent:

UNITED STATES PATENTS

| Number | Name | Date |
| --- | --- | --- |
| 520,719 | Walker et al. | May 29, 1894 |
| 810,364 | Allen | Jan. 16, 1906 |
| 1,093,745 | Turner | Apr. 21, 1914 |
| 1,475,365 | Schueler et al. | Nov. 27, 1923 |
| 1,639,534 | Ruben | Aug. 16, 1927 |
| 1,778,524 | Durbin | Oct. 14, 1930 |
| 1,784,420 | Dietert | Dec. 9, 1930 |
| 1,889,510 | Amsler | Nov. 29, 1932 |
| 1,961,893 | Wadman et al. | June 5, 1934 |
| 2,032,016 | Hitner | Feb. 25, 1936 |
| 2,102,823 | Walsh et al. | Dec. 21, 1937 |
| 2,102,955 | Hulme | Dec. 21, 1937 |
| 2,148,706 | Morrow | Feb. 28, 1939 |
| 2,368,937 | McGillin et al. | Feb. 6, 1945 |

FOREIGN PATENTS

| Number | Country | Date |
| --- | --- | --- |
| 623,555 | Germany | Dec. 28, 1935 |